(12) United States Patent
Sigwanz

(10) Patent No.: US 6,587,568 B1
(45) Date of Patent: Jul. 1, 2003

(54) HEARING AID AND METHOD FOR OPERATING A HEARING AID TO SUPPRESS ELECTROMAGNETIC DISTURBANCE SIGNALS

(75) Inventor: Ullrich Sigwanz, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 0 days.

(21) Appl. No.: 09/762,875

(22) PCT Filed: Aug. 3, 1999

(86) PCT No.: PCT/EP99/05631
§ 371 (c)(1),
(2), (4) Date: Jul. 27, 2001

(87) PCT Pub. No.: WO00/10363
PCT Pub. Date: Feb. 24, 2001

(30) Foreign Application Priority Data

Aug. 13, 1998 (DE) .......................... 198 36 784

(51) Int. Cl.⁷ .............................................. H04R 25/00
(52) U.S. Cl. .................. 381/317; 381/312; 381/324; 381/314
(58) Field of Search ................... 381/312, 313, 381/314, 316, 317, 315, 318, 321, 322, 324, 71.1, 71.11, 71.14, 73.1, 94.1, 93, 100, 94.3

(56) References Cited

U.S. PATENT DOCUMENTS 4,025,721 A    5/1977  Graupe et al.
4,845,755 A *  7/1989  Busch et al. ................. 381/312
4,953,216 A    8/1990  Beer
5,608,803 A    3/1997  Magptra et al.
5,796,848 A *  8/1998  Martin ........................ 381/312
5,883,927 A *  3/1999  Madsen et al. ............. 375/296

FOREIGN PATENT DOCUMENTS

| AT | 398 670 | 1/1995 |
|----|---------|--------|
| DE | OS 37 33 983 | 4/1989 |
| DE | PS 41 25 377 | 4/1993 |
| DE | PS 39 27 765 | 5/1993 |
| DE | OS 195 25 944 | 1/1997 |
| EP | 0 835 041 | 4/1996 |
| EP | 0 800 331 | 10/1997 |
| EP | 0 843 427 | 5/1998 |
| WO | WO 93/20669 | 10/1993 |
| WO | WO 96/37086 | 11/1996 |

* cited by examiner

Primary Examiner—Rexford Barnie
(74) Attorney, Agent, or Firm—Schiff Hardin & Waite

(57) ABSTRACT

Given a hearing aid comprising a microphone, a signal processing unit and an earphone, a detector element for detecting electromagnetic disturb signals is provided, as well as a filter element that is configured dependent on the recognized disturbance signals in order to suppress the disturbance signals. Furthermore, the hearing aid as a clock element for acquiring the clock frequency of the disturbance signal detected by the detector element, whereby the clock element serves the purpose of generating the system clock frequency of the hearing aid proceeding from the clock frequency of the disturbance signal. This enables a particularly efficient disturbance signal suppression.

11 Claims, 1 Drawing Sheet

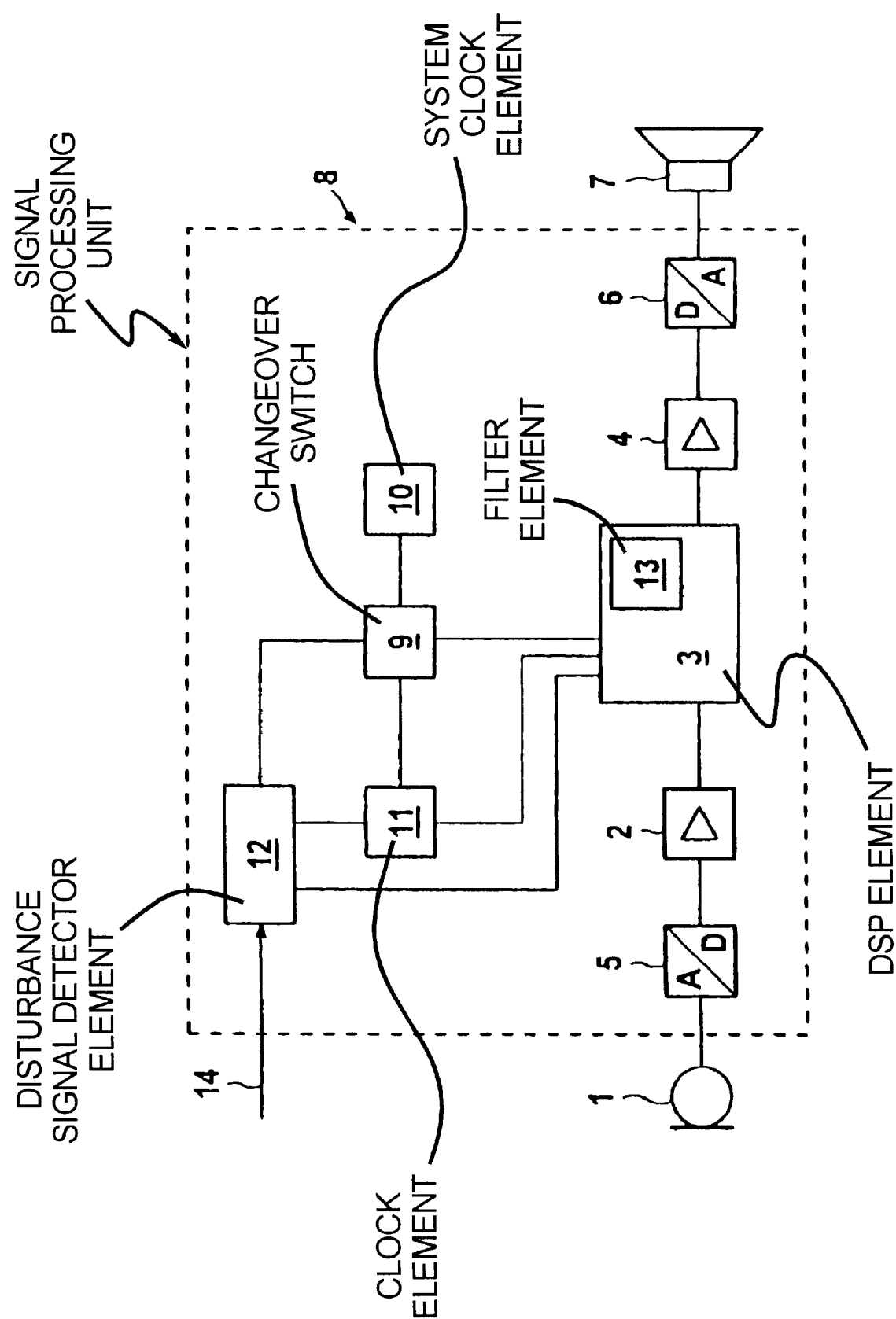

HEARING AID AND METHOD FOR OPERATING A HEARING AID TO SUPPRESS ELECTROMAGNETIC DISTURBANCE SIGNALS

BACKGROUND OF THE INVENTION

1. Field of the Invention

The present invention relates to a hearing aid having a microphone, a signal processing unit and an earphone, to a method for suppressing electromagnetic disturb signals in a hearing aid of this type.

2. Description of the Prior Art

Signal processing in hearing aids can be impaired by electromagnetic disturb signals, for example by noise fields of mobile telephones. An improvement of the electromagnetic compatibility (EMC) of hearing aids, for example by interconnect optimization and capacitive shielding of microphones, cannot eliminate the noise sensitivity.

European Patent 0 843 427 discloses a system, which uses adaptive comb filters for suppressing periodic electromagnetic disturbance signals. It is necessary to adapt the cutoff frequencies and bandwidths of the comb filter as accurately as possible to the disturbance signal, so that the useful signal is impaired as little as possible.

SUMMARY OF THE INVENTION

An object of the invention is to provide a hearing aid and a method, wherein disturbance signals and noise fields are reliably suppressed.

The above object is achieved in accordance with the principles of the present invention in a method for suppressing electromagnetic disturbance signals in a hearing aid, and a hearing aid operating according to the method, wherein a clock element acquires the clock frequency of the disturbance signal that is detected by a detector element in the hearing aid, and the clock element generates a signal and a system clock frequency dependent on the clock frequency of the disturbance signal.

The term "hearing aid" as used herein refers to separate hearing aids that can be worn at the head or at the body, to hearing aids that can be worn behind the ear, in the ear, to pocket hearing aids and also to hearing aids that can be implanted.

In the inventive hearing aid, it is initially determined via a detector element whether electromagnetic disturbance signals or noise fields are present. If this is the case, a filter element is configured depending on the type of the recognized disturbance signals in order to suppress the noise fields. In this way, the disturbance signals can be filtered out in a way that is adapted to the particular type of the noise field and therefore the filtering is particularly efficient. For example, a comb filter, whose filter characteristic is exactly adapted to the respective disturbance signal, is configured in the filter element. The system clock of the hearing aid can be utilized for configuring the comb filter. Besides, the inventive hearing aid has a clock element for acquiring the clock frequency of the disturbance signal acquired by the detector element. The acquired clock frequency of the disturbance signal is then used for generating the system clock frequency, particularly by frequency multiplication. On the basis of the current clock frequency of the disturbance signal, the system clock frequency is newly generated. The clock frequency of the system clock element of the hearing aid, which is altered or falsified as a result of aging or drift, for example, can be switched off and the newly generated system clock frequency that is derived from the clock frequency of the disturb signal can be used for operating and particularly for configuring the filter element. As a result thereof, a particularly precisely configured filter element is achieved, which is able to suppress the determined disturbance signals in a particularly effective way.

If the clock element has a PLL circuit ("phase-locked-loop"), the generated system clock frequency can be generated as a rational multiple of the isolated and acquired disturb signal frequency.

A change element can be connected between the clock element and the system clock element, so that the previous system clock element, after the new system clock frequency has been generated, can be switched off and the hearing aid can be operated for generating a suitable filter characteristic with the newly derived system clock frequency.

In principle, the inventive hearing aid can be digitally or analogously constructed. Given a digital construction, the hearing aid can have a DSP element (digital signal processor element) for a particularly precise signal processing having a number of versions. The filter element for suppressing the disturb signals can be integrated into the DSP element or it can be arranged directly in front of the A-D converter, for example, for particularly effective suppression of the disturbance signals at the end of the signal transmission chain.

After the disturbance signals have been detected, a filter element is inventively configured dependent on the detected disturbance signals for the adapted suppression of the disturbance signals.

The suppression of the disturbance signals is particularly efficient when the clock frequency of the disturbance signal is initially acquired and isolated and when the system clock frequency is subsequently generated particularly by frequency multiplication. As a result of this generated system clock frequency, the filter element can be particularly precisely configured (e.g. high-pass filter, low-pass filter, comb filter, FFT), since the system clock of the hearing aid, that is may be falsified as a result of aging or drift, is not used.

In this version of the inventive method, the disturbance signal itself generates a suitable filtering for suppressing the disturbance signal.

The inventive method is particularly suited for of suppressing electromagnetic disturbance signals of mobile telephones (e.g. according to the GSM standard or DECT standard) and for acquiring the interference characteristics of known mobile radio networks (e.g. D1 network, D2 network, E network, E-plus network).

Electromagnetic noise fields which occur in connection with the network frequency can be detected and suppressed when the hearing aid is operated by means of a telephone coil.

In addition, the detector element can be used for detecting, for example, the ringing or the activation of the mobile telephone due to the arising frequency signals and for making it perceptible directly in the hearing aid.

DESCRIPTION OF THE DRAWING

The single FIGURE is a schematic block diagram of a hearing aid constructed and operating in accordance with the principles of the present invention.

DESCRIPTION OF THE PREFERRED EMBODIMENTS

The basic diagram shows a hearing aid having a microphone 1, a signal processing unit 8 and an earphone 7. The A-D converter 5, the preamplifier 2, the DSP element 3, the postamplifier 4 and the D-A converter 6 are arranged in the signal processing path between the microphone 1 and the earphone 7.

The hearing aid receives the electromagnetic disturbance signal 14 via the detector element 12 and therefore detects the presence of, for example, a GSM telephone in the D1 network. The detector element 12 transmits the information about the detected noise field type (namely GSM telephone, D1 network) to the DSP element 3, so that the filter element 13 can be configured in a way that is adapted to the detected noise field type for the particularly effective noise field suppression.

As shown, the filter element can be integrated into the DSP element 3 or, for a particularly efficient noise field suppression, can be arranged at the end of the signal transmission chain between the microphone 1 and the earphone 7—particularly after the postamplifier 4 and in front of the D-A converter 6 (not shown).

In the exemplary embodiment of the hearing aid, the detector element 12 forwards the information via the detected noise field type to the clock element 11, which may be a PLL circuit, in particular. The clock frequency is acquired and isolated in the clock element 11 and the system clock that is normally provided by the system clock element 10 is newly generated by frequency multiplication. For example, when the noise field has a clock frequency of 200 Hz, which has been isolated, a system clock frequency of 20 kHz can be generated by frequency multiplication with the factor 100, whereby the system clock frequency serves the purpose of directly timing the DSP element 3 in that the changeover switch 9 is operated when the system clock element 10 is switched off. In this way, a particularly efficient noise field suppression can occur in the filter element 13 as a result of the newly generated system clock of the clock element 11.

The clock of the system clock element 10, that may be falsified as a result of aging or a temperature drift, is switched off, so that a faulty configuration of the filter element 13 by a falsified system clock is prevented.

The clock element 11 receives necessary bits of information from the DSP element 3 for generating the system clock, for example. As a result of the frequency multiplication, the system clock can be either generated exactly or with a slight deviation.

The stored coefficient sets can be updated and can include all data variables or correcting variables, which are necessary for an effective interference elimination by the filter element 13.

Although modifications and changes may be suggested by those skilled in the art, it is the intention of the inventors to embody within the patent warranted hereon all changes and modifications as reasonably and properly come within the scope of their contribution to the art.

I claim:

1. A hearing aid comprising:
   a microphone which converts an incoming audio signal into an electrical microphone output signal;
   a signal processing unit connected to said microphone for processing said microphone output signal to produce a processed signal, said signal processing unit including a filter element which is configurable dependent on a system clock frequency in said signal processing unit;
   a detector element for detecting externally-originating electromagnetic disturbance signals, said disturbance signals having a clock frequency;
   a clock element in said signal processing unit, connected to said detector element, for identifying the clock frequency of the disturbance signal and wherein said signal processing unit generates said system clock frequency dependent on said clock frequency of said disturbance signal to configure said filter element to filter said disturbance signal out of said processed signal; and
   an earphone supplied with said processed signal for converting said processed signal into an audio output signal.

2. A hearing aid as claimed in claim 1 wherein said clock element is a phase-locked loop circuit.

3. A hearing aid as claimed in claim 1 wherein said signal processing unit includes a system clock which generates said system clock frequency, and further comprising a processor in said signal processing unit connected to said filter, which configures said filter, a system clock generator which generates said system clock frequency, and a changeover switch connected to said clock element, said system clock generator and said processor for selectively supplying one of said system clock frequency and said clock frequency of said disturbance signal to said processor.

4. A hearing aid as claimed in claim 3 wherein said processor is a digital signal processor.

5. A hearing aid as claimed in claim 4 wherein said filter element is integrated into said digital signal processor.

6. A method for operating a hearing aid having a microphone which converts incoming audio signals into electrical microphone output signals, a signal processing unit which processes said microphone output signals to produce a processed signal, and an earphone supplied with said processed signal for converting said processed signal into an audio output signal, said method comprising the steps of:
   in said hearing aid, detecting externally-originating electromagnetic disturbance signals, said disturbance signals having a clock frequency;
   in said signal processing unit, identifying the clock frequency of the disturbance signal;
   generating a system clock frequency for use in producing said processed signal dependent on said clock frequency of said disturbance signal; and
   configuring a filter element in said signal processing unit using said system clock frequency, dependent on said clock frequency of said disturbance signal, to filter said disturbance signal out of said processed signal.

7. A method as claimed in claim 6 wherein the step of detecting externally-originating electromagnetic disturbance signals comprises detecting a disturbance signal originating from a mobile telephone.

8. A method as claimed in claim 6 wherein the step of detecting externally-originating electromagnetic disturbance signal comprises detecting a noise field associated with a mobile telephone.

9. A method as claimed in claim 6 wherein the step of detecting an externally-originating electromagnetic disturbance signal comprises detecting a disturbance signal originating from a mobile telephone, and wherein said method comprises the additional steps of employing a telephone coil in place of said microphone for picking up incoming telephone audio signals and converting said incoming telephone audio signals into a coil output signal supplied to said signal processing unit for producing said processed signal, and detecting said disturbance signals when said telephone coil is used in place of said microphone.

10. A method as claimed in claim 6 comprising employing a comb filter as said filter element.

11. A method as claimed in claim 6 wherein said comb filter is configurable according to a selected one of a plurality of coefficient sets, and comprising the steps of storing said coefficient sets in said signal processing unit and selecting one of said coefficient sets for configuring said comb filter dependent on said clock frequency of said disturbance signal.

* * * * *